United States Patent
Lin et al.

(10) Patent No.: US 11,697,705 B2
(45) Date of Patent: Jul. 11, 2023

(54) CANNABIDIOL-CONTAINING BIO-BASED POLYURETHANE COMPOSITE MATERIAL AND PREPARATION METHOD THEREOF

(71) Applicant: ZHANGJIAGANG COOLIST LIFE TECHNOLOGY CO., LTD., Jiangsu (CN)

(72) Inventors: Kaixuan Lin, Jiangsu (CN); Ren Ma, Jiangsu (CN); Xiaofang Lin, Jiangsu (CN)

(73) Assignee: ZHANGJIAGANG COOLIST LIFE TECHNOLOGY CO., LTD., Suzhou (CN)

( * ) Notice: Subject to any disclaimer, the term of this patent is extended or adjusted under 35 U.S.C. 154(b) by 238 days.

(21) Appl. No.: 17/174,290

(22) Filed: Feb. 11, 2021

(65) Prior Publication Data

US 2022/0041791 A1     Feb. 10, 2022

(30) Foreign Application Priority Data

Aug. 9, 2020 (CN) .......................... 202010792441.5

(51) Int. Cl.

| | |
|---|---|
| C08G 18/48 | (2006.01) |
| C08G 18/32 | (2006.01) |
| C08G 18/36 | (2006.01) |
| C08G 18/66 | (2006.01) |
| C08L 75/14 | (2006.01) |
| C08G 18/67 | (2006.01) |
| C08G 18/76 | (2006.01) |
| C08G 18/80 | (2006.01) |

(52) U.S. Cl.
CPC ..... *C08G 18/4845* (2013.01); *C08G 18/3215* (2013.01); *C08G 18/36* (2013.01); *C08G 18/485* (2013.01); *C08G 18/4812* (2013.01); *C08G 18/4841* (2013.01); *C08G 18/6674* (2013.01); *C08G 18/6696* (2013.01); *C08G 18/675* (2013.01); *C08G 18/7664* (2013.01); *C08G 18/8061* (2013.01); *C08L 75/14* (2013.01); *C08L 2201/06* (2013.01); *C08L 2201/08* (2013.01); *C08L 2205/02* (2013.01); *C08L 2205/03* (2013.01)

(58) Field of Classification Search
CPC ........... C08G 18/4845; C08G 18/3215; C08G 18/36; C08G 18/4812; C08G 18/4841; C08G 18/6696; C08G 18/6674; C08G 18/675; C08G 18/7664; C08G 18/8061; C08G 18/485; C08L 75/14; C08L 2201/06; C08L 2201/08; C08L 2205/02; C08L 2205/03
See application file for complete search history.

(56) References Cited

U.S. PATENT DOCUMENTS

2013/0109804 A1*   5/2013   Kusaka .............. C08G 64/1608
                                                          528/370

FOREIGN PATENT DOCUMENTS

| CN | 106084175 A | 11/2016 |
|---|---|---|
| CN | 109651591 A | 4/2019 |
| CN | 111253549 A | 6/2020 |

* cited by examiner

Primary Examiner — Patrick D Niland

(57) ABSTRACT

Disclosed herein are a cannabidiol (CBD)-containing bio-based polyurethane composite material and a preparation thereof. The composite material is prepared from a component A and a component B in a weight ratio of 100:(20-50), where the component A includes 40-60 parts by weight of a vegetable oil-based polyol, 35-50 parts by weight of polyether polyol I, 0-10 parts by weight of polyether polyol II, 0.5-5 parts by weight of CBD, 0-5 parts by weight of a natural pigment, 0.5-3 parts by weight of silicon oil, 0-5 parts by weight of a cross-linking agent, 0.2-1 part by weight of a catalyst and 0.8-4 parts by weight of water, and the component B includes 20-50 parts by weight of modified methylene diphenyl diisocyanate (MDI).

6 Claims, No Drawings

CANNABIDIOL-CONTAINING BIO-BASED POLYURETHANE COMPOSITE MATERIAL AND PREPARATION METHOD THEREOF

CROSS-REFERENCE TO RELATED APPLICATIONS

This application claims the benefit of priority from Chinese Patent Application No. 202010792441.5, filed on Aug. 9, 2020. The content of the aforementioned application, including any intervening amendments thereto, is incorporated herein by reference in its entirety.

TECHNICAL FIELD

This application relates to polymer chemistry, and more particularly to a cannabidiol (CBD)-containing bio-based polyurethane composite material and a preparation method thereof.

BACKGROUND

Polyurethane is a commonly-used polymer material in daily life. In the industrial production of polyurethane, the raw material polyol is mainly derived from petrochemical products. Considering that the petroleum is a non-renewable resource, and the conventional polyurethane products are non-biodegradable and their burning treatments will cause air pollution, there is an urgent need to develop a novel and degradable polyurethane material.

Due to the desirable sustainability and degradability, the natural vegetable oil-based material is considered as an appropriate substitute for the traditional petrochemical product in the preparation of polyurethane materials. Nevertheless, the relatively high protein content makes the vegetable oil-based polyurethane composite material prone to deterioration caused by bacterial growth.

As a main extract of industrial hemp, Cannabidiol (CBD) has anti-inflammatory, antibacterial, analgesic, anti-anxiety, anti-psychotic and anti-oxidant activities. Different from tetrahydrocannabinol (THC) which is a main psychoactive cannabinoid found in hemp and often causes the hemp-related "high" sensation, the CBD is free of psychoactivity, and moreover, the CBD has been demonstrated by researches to have a great potential in the treatment of various diseases such as chronic pain and anxiety. In view of this, it is urgent for those skilled in the art to design a method to introduce the CBD into the polyurethane composite materials and avoid the deterioration of the vegetable oil-based polyurethane composite materials.

SUMMARY

An object of this disclosure is to provide a bio-based polyurethane composite material containing CBD to overcome the defects in the prior art.

Technical solutions of this disclosure are described as follows.

In a first aspect, this disclosure provides a CBD-containing bio-based polyurethane composite material, and the CBD-containing bio-based polyurethane composite material is prepared from a component A and a component B in a weight ratio of 100:(20-50);
wherein the component A comprises:
40-60 parts by weight of a vegetable oil-based polyol;
35-50 parts by weight of polyether polyol I;
0-10 parts by weight of polyether polyol II;
0.5-5 parts by weight of CBD;
0-5 parts by weight of a natural pigment;
0.5-3 parts by weight of silicon oil;
0-5 parts by weight of a cross-linking agent;
0.2-1 part by weight of a catalyst; and
0.8-4 parts by weight of water;
the component B comprises:
20-50 parts by weight of modified methylene diphenyl diisocyanate (MDI);
wherein the polyether polyol I is 15% ethylene oxide-capped propylene oxide polyether polyol having a molecular weight of 1000-2000, a functionality of 3 and a hydroxyl value of 50-170 mg KOH/g; and the polyether polyol II is 15% propylene oxide-capped ethylene oxide polyether polyol having a functionality of 2 and a hydroxyl value of 100.

The 15% ethylene oxide-capped propylene oxide polyether polyol is prepared as follows. A low-molecular-weight polyether glycol is used as an initiator and reacted with propylene oxide in the presence of a catalyst, and then the resulting product is capped with ethylene oxide and subjected to neutralization, filtration and vacuum distillation to produce the desired product, where the ethylene oxide is 15% of a total weight of the raw materials.

The 15% propylene oxide-capped ethylene oxide polyether polyol is prepared as follows. A low-molecular-weight polyether glycol is used as an initiator and reacted with ethylene oxide in the presence of a catalyst, and then the resulting product is capped with propylene oxide, where the capped product has a secondary hydroxyl as the terminal group, and the propylene oxide is 15% of a total weight of the raw materials. The capped product is further subjected to neutralization, filtration and vacuum distillation to obtain the desired product.

Compared to conventional ethylene oxide-capped propylene oxide polyether polyol, the 15% ethylene oxide-capped propylene oxide polyether polyol provided herein has high activity, good low-temperature sensitivity, excellent thermoplasticity and desirable tensile strength.

In some embodiments, the vegetable oil-based polyol is a cottonseed oil-based polyol having a functionality of 1-3 and a hydroxyl value of 60-140 mg KOH/g.

In some embodiments, the CBD is an oily or powdery cannabidiol compound extracted from industrial hemp.

In some embodiments, the natural pigment has a size of 100-500 mesh, and the natural pigment is sodium copper chlorophyllin.

In some embodiments, the silicon oil is a mixture of dimethyl silicone oil and polyether silicone oil in a weight ratio of 1:4.

In some embodiments, the modified MDI is prepared through modifying isocyanate with palm oil.

In some embodiments, the modified MDI is prepared through the steps of:

1) weighing 100 parts by weight of the palm oil, 70-80 parts by weight of MDI-50 and 20-30 parts by weight of polymeric MDI; and 2) dewatering the 100 parts by weight of the palm oil to a moisture content of less than 0.05% at 110-120° C.; adding 40-50 parts by weight of the MDI-50 into the dewatered palm oil at 75-80° C.; heating the reaction mixture under stirring to 100° C. followed by reaction for 2-4 h; cooling the reaction mixture to room temperature; and adding the 20-30 parts of the polymeric MDI and the remaining MDI-50 into the reaction mixture followed by stirring to produce the modified MDI.

The modified MDI can improve the content of the bio-based component in the polyurethane composite material.

In a second aspect, this disclosure provides a method for preparing the above CBD-containing bio-based polyurethane composite material, comprising:
1) adding the vegetable oil-based polyol, the polyether polyol I and the polyether polyol II into a reactor followed by stirring at 50-70° C.;
2) adding the silicon oil, the cross-linking agent, the catalyst and water into the reactor in step (1) followed by centrifugation at 300-500 rpm; and
3) adding the CBD, the natural pigment and the modified MDI into the reactor under stirring; and subjecting the reaction mixture to reactive molding at room temperature to produce the CBD-containing bio-based polyurethane composite material;

wherein a weight ratio of the vegetable oil-based polyol to the polyether polyol I to the polyether polyol II to the silicon oil to the cross-linking agent to the catalyst to the water to the CBD to the natural pigment to the modified MDI is (40-60):(35-50):(0-10):(0.5-3):(0-5):(0.2-1):(0.8-4):(0.5-5):(20-50).

Compared to the prior art, this disclosure has the following beneficial effects.

The CBD-containing bio-based polyurethane composite material includes a vegetable oil-based polyol as a main component, polyether polyol I, polyether polyol II and modified MDI. Through the synergistic effect among individual components, the composite material is endowed with good stability and excellent degradability. Moreover, the addition of CBD helps to relieve anxiety during sleeping, so as to improve sleep quality of people. In addition, the supplement of a natural and non-toxic pigment with antibacterial activity, such as sodium copper chlorophyll, can effectively prevent the composite material from being mildewed.

DETAILED DESCRIPTION OF EMBODIMENTS

This disclosure will be further described below with reference to the embodiments, but is not limited thereto. Unless otherwise specified, the experiments in the following embodiments are carried out according to conventional methods and conditions, or as instructed by the manufacture. Moreover, individual components are not limited to those used below, and any suitable combination of other materials mentioned above is also feasible.

In the embodiments, a vegetable oil-based polyol was a cottonseed oil-based polyol having a functionality of 1-3 and a hydroxyl value of 60-140 mg KOH/g. Polyether polyol I was 15% ethylene oxide-capped propylene oxide polyether polyol having a molecular weight of 1000-2000, a functionality of 3 and a hydroxyl value of 50-170. Polyether polyol II was 15% propylene oxide-capped ethylene oxide polyether polyol having a functionality of 2 and a hydroxyl value of 100. CBD was an oily or powdery cannabidiol compound extracted from industrial hemp. A natural pigment had a size of 100-500 mesh. The natural pigment used herein was sodium copper chlorophyllin. Silicon oil was a mixture of dimethyl silicone oil and polyether silicone oil in a weight ratio of 1:4.

The modified MDI was prepared by modifying isocyanate with palm oil. Specifically, 100 parts by weight of the palm oil, 70-80 parts by weight of MDI-50 and 20-30 parts by weight of polymeric MDI were weighed. 100 parts by weight of the palm oil was dewatered to a moisture content of less than 0.05% at 110-120° C., and then 40-50 parts by weight of the MDI-50 was added into the dewatered palm oil at 75-80° C. The reaction mixture was heated under stirring to 100° C. followed by reaction for 2-4 h. The reaction mixture was cooled to room temperature. The polymeric MDI and the remaining MDI-50 were added into the reaction mixture followed by stirring to produce the CBD-containing bio-based polyurethane composite material.

Five examples and a comparative example were provided herein, and the composition thereof was shown in Table 1.

TABLE 1

Composition of Examples 1-5 and Comparative example

|  | Example 1 | Example 2 | Example 3 | Example 4 | Example 5 | Comparative example |
|---|---|---|---|---|---|---|
| Vegetable oil-based polyol | 45 | 40 | 60 | 42 | 43 | 50 |
| Polyether polyol I | 45 | 50 | 35 | 37 | 35 | 40 |
| Polyether polyol II | 3 | 0 | 1 | 10 | 5 | 0 |
| CBD | 0.5 | 2 | 0.7 | 3 | 5 | 0 |
| Natural pigment | 1.5 | 5 | 0.5 | 0 | 2 | 0 |
| Silicon oil | 0.5 | 1 | 1.5 | 2 | 3 | 2 |
| Cross-linking agent | 2.5 | 1 | 0 | 1 | 5 | 6 |
| Catalyst | 0.5 | 0.2 | 0.3 | 1 | 0.6 | 2 |
| Water | 1 | 0.8 | 2 | 4 | 1.4 | 1.5 |
| Modified MDI | 25 | 20 | 40 | 50 | 30 | 30 |

The preparation of the CBD-containing bio-based polyurethane composite materials in Examples 1-5 was described as follows.
1) The vegetable oil-based polyol, the polyether polyol I and the polyether polyol II were added into a reactor and stirred at 50-70° C.
2) The silicon oil, the cross-linking agent, the catalyst and the water were added into the reactor in step (1) and centrifuged at 300-500 rpm.
3) The CBD, the natural pigment and the modified MDI were added into the reactor in step (2) under stirring, and subjected to reactive molding at room temperature.

1. Antibacterial Activity Test

The composite materials obtained in Examples 1-5 and Comparative example were quantitatively evaluated for the antibacterial activity according to ISO 20743:2013, and the results were presented in Table 2, where Ma: logarithm of bacterial concentration at initial stage; Mb: logarithm of the number of bacteria after 24 h of the incubation without the composite material; Mc: logarithm of the number of bacteria after 24 h of the incubation with the composite material; S: logarithm of the number of bacteria after 24 h of the antibacterial treatment; and the inoculated bacterial strain was *Staphylococcus aureus*.

TABLE 2

Antibacterial activity of polyurethane composite materials in Examples 1-5 and Comparative example

| (Ma) | Log $2.04 \times 10^4$ = 4.3 |
|---|---|
| (Mb) | Log $9.65 \times 10^6$ = 7.0 |
| Growth Value (F1 = Mb − Ma) | 2.7 |

| Sample | The number of bacteria | Logarithm of the number of recovered bacteria (Mc) | Logarithm of the number of decreased bacteria (S) | Percentage of the reduced bacteria |
|---|---|---|---|---|
| Example 1 | $3.20 \times 10^1$ | 1.8 | 4.8 | >96.0% |
| Example 2 | $4.20 \times 10^1$ | 1.3 | 5.3 | >93.6% |
| Example 3 | $5.50 \times 10^1$ | 1.5 | 4.3 | >95.2% |
| Example 3 | $4.50 \times 10^1$ | 1.4 | 4.5 | >95.6% |
| Example 5 | $<1.50 \times 10^1$ | <1.0 | >5.6 | >97.8% |
| Comparative example | $3.10 \times 10^4$ | 6.2 | 1.3 | >56% |

Table 2 showed that compared to the composite material in Comparative Example, the composite materials prepared by the method provided herein had superior antibacterial activity. Furthermore, among the five samples provided herein, the composite material obtained in Example 5 exhibited the highest decline percentage in the number of bacteria and the smallest number of recovered bacteria, which indicated that the composite material of Example 5 had the optimal antibacterial activity.

2. Mildew Resistance Test

The composite materials obtained in Examples 1-5 and Comparative example were tested for the mildew resistance according to the standards of AATCC 30, and the results were shown in Tables 3 and 4.

TABLE 3

Resistance of polyurethane composite materials in Examples 1-5 and Comparative example to *Aspergillus niger*

| Sample | Bacterial inhibition zone (mm) | *Aspergillus niger* (ATCC #6275) Surface inhibition (%) |
|---|---|---|
| Example 1 | 0 | 97.7 |
| Example 2 | 0 | 98.3 |
| Example 3 | 0 | 97.5 |
| Example 3 | 0 | 96.1 |
| Example 5 | 0 | 99.2 |
| Comparative example | 0 | 55 |

Referring to Table 3, it was demonstrated that the composite materials prepared by the method provided herein had excellent antibacterial activity, and the composite material obtained in Example 5 had the optimal surface inhibition effect on *Aspergillus niger*.

TABLE 4

Resistance of polyurethane composite materials in Examples 1-5 and Comparative example to *Trichoderma virens*

| Sample | Bacterial inhibition zone (mm) | *Trichoderma virens* (ATCC #9645) Surface inhibition (%) |
|---|---|---|
| Example 1 | 0 | 96 |
| Example 2 | 0 | 95 |
| Example 3 | 0 | 96 |
| Example 3 | 0 | 95 |

TABLE 4-continued

Resistance of polyurethane composite materials in Examples 1-5 and Comparative example to *Trichoderma virens*

| Sample | Bacterial inhibition zone (mm) | *Trichoderma virens* (ATCC #9645) Surface inhibition (%) |
|---|---|---|
| Example 5 | 0 | 98 |
| Comparative example | 0 | 30 |

Table 4 showed that the composite materials prepared by the method provided herein had desirable antibacterial activity, and the composite material obtained in Example 5 had the best surface inhibition effect on *Trichoderma vixens*.

The above-mentioned embodiments are merely illustrative of the technical solutions and features of the present disclosure to enable those skilled in the art to understand and implement this disclosure, and are not intended to limit the scope of the present disclosure. Any changes and modifications made without departing from the spirit of this disclosure should fall within the scope of the present disclosure.

What is claimed is:

1. A cannabidiol (CBD)-containing bio-based polyurethane composite material, wherein the cannabidiol (CBD)-containing bio-based polyurethane composite material is prepared from a component A and a component B in a weight ratio of 100:(20-50);
   wherein the component A comprises:
   40-60 parts by weight of a vegetable oil-based polyol;
   35-50 parts by weight of polyether polyol I;
   0-10 parts by weight of polyether polyol II;
   0.5-5 parts by weight of CBD;
   0-5 parts by weight of a natural pigment;
   0.5-3 parts by weight of silicon oil;

0-5 parts by weight of a cross-linking agent;
0.2-1 part by weight of a catalyst; and
0.8-4 parts by weight of water;
the component B comprises:
20-50 parts by weight of modified methylene diphenyl diisocyanate (MDI);
wherein the polyether polyol I is 15% ethylene oxide-capped propylene oxide polyether polyol having a number-average molecular weight of 1000-2000, a functionality of 3 and a hydroxyl value of 50-170 mg KOH/g; and the polyether polyol II is 15% propylene oxide-capped ethylene oxide polyether polyol having a functionality of 2 and a hydroxyl value of 100; and
the modified MDI is prepared by modifying isocyanate with palm oil through steps of:
1) Weighing 100 parts by weight of the palm oil, 70-80 parts by weight of MDI-50 and 20-30 parts by weight of polymeric MDI; and
2) Dewatering the 100 parts by weight of the palm oil to a moisture content of less than 0.05% at 110-120° C.; adding 40-50 parts by weight of the MDI-50 into the dewatered palm oil at 75-80° C.; heating the reaction mixture under stirring to 100° C. followed by reaction for 2-4 h; cooling the reaction mixture to room temperature; and adding the 20-30 parts of the polymeric MDI and the remaining MDI-50 into the reaction mixture followed by stirring to produce the modified MDI.

2. The CBD-containing bio-based polyurethane composite material of claim 1, wherein the vegetable oil-based polyol is a cottonseed oil-based polyol having a functionality of 1-3 and a hydroxyl value of 60-140 mg KOH/g.

3. The CBD-containing bio-based polyurethane composite material of claim 1, wherein the CBD is an oily or powdery cannabidiol compound extracted from industrial hemp.

4. The CBD-containing bio-based polyurethane composite material of claim 1, wherein the natural pigment has a size of 100-500 mesh.

5. The CBD-containing bio-based polyurethane composite material of claim 1, wherein the silicon oil is a mixture of dimethyl silicone oil and polyether silicone oil in a weight ratio of 1:4.

6. A method for preparing the CBD-containing bio-based polyurethane composite material of claim 1, comprising:
1) Adding the vegetable oil-based polyol, the polyether polyol I and the polyether polyol II into a reactor followed by stirring at 50-70° C.;
2) Adding the silicon oil, the cross-linking agent, the catalyst and the water into the reactor in step (1) followed by centrifugation at 300-500 rpm; and
3) Adding the CBD, the natural pigment and the modified MDI into the reactor under stirring; and subjecting the reaction mixture to reactive molding at room temperature to produce the CBD-containing bio-based polyurethane composite material.

\* \* \* \* \*